United States Patent [19]

Hasegawa et al.

[11] Patent Number: 5,654,359

[45] Date of Patent: Aug. 5, 1997

[54] PAPER COATING COMPOSITION

[75] Inventors: Toshiyuki Hasegawa, Osaka; Yoshifumi Yoshida, Hyogo; Akira Tanikawa; Fujiko Kumei, both of Osaka, all of Japan

[73] Assignee: Sumitomo Chemical Company, Limited, Osaka, Japan

[21] Appl. No.: 607,917

[22] Filed: Feb. 28, 1996

Related U.S. Application Data

[63] Continuation of Ser. No. 274,439, Jul. 13, 1994, abandoned.

[30] Foreign Application Priority Data

| Jul. 16, 1993 | [JP] | Japan | 5-176563 |
| Oct. 13, 1993 | [JP] | Japan | 5-255700 |
| Nov. 8, 1993 | [JP] | Japan | 5-278226 |
| Mar. 1, 1994 | [JP] | Japan | 6-031363 |
| May 11, 1994 | [JP] | Japan | 6-097745 |

[51] Int. Cl.$^6$ .................................................. C08K 5/17
[52] U.S. Cl. .................. 524/514; 524/501; 524/502; 524/503; 524/512; 524/538; 524/227; 524/47; 524/49
[58] Field of Search .................. 524/514, 501, 524/502, 503, 512, 538, 227, 47, 49

[56] References Cited

U.S. PATENT DOCUMENTS

| 4,246,153 | 1/1981 | Takagishi et al. | 260/29.4 |
| 4,444,943 | 4/1984 | Kawakami et al. | 524/501 |
| 4,464,505 | 8/1984 | Kawakami et al. | 524/501 |
| 5,034,501 | 7/1991 | Ura et al. | 528/263 |
| 5,131,951 | 7/1992 | Yoshida et al. | 524/608 |
| 5,270,355 | 12/1993 | Kawano et al. | 523/404 |

FOREIGN PATENT DOCUMENTS

| 0081994 | 6/1983 | European Pat. Off. |
| 58-126394 | 7/1983 | Japan |
| 4-82996 | 3/1992 | Japan |
| 4-100996 | 4/1992 | Japan |
| 4-241198 | 8/1992 | Japan |

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

A paper coating composition comprising (I) a pigment, (II) an aqueous binder, and (III) a water-soluble resin obtainable by the reaction of at least (a) an alkylenediamine or a polyalkylenepolyamine, (b) an urea compound, and (c) a compound selected from aldehydes, epihalohydrins and is further improved by incorporating therein, (IV) a compound selected from the group consisting of (f) amines selected from the group consisting of monoamines, diamines and their salts each having at least 4 carbon atoms, (g) quaternary organic ammonium salts, and (h) polyamides obtainable by the reaction between a dibasic carboxylic compound and a polyamine. The water-soluble resin of the component (III) may be further allowed to react with a dibasic carboxylic compound, an alicyclic amine and/or an alicyclic epoxy compound in addition to the above three ingredients. Paper coated by using the above composition is especially excellent in ink receptivity and water resistance.

18 Claims, No Drawings

PAPER COATING COMPOSITION

This is a Continuation of application Ser. No. 08/274,439 filed Jul. 13, 1994, now abandoned.

The present invention relates to a paper coating composition, and more particularly to a composition imparting excellent printing quality and excellent results of printing to paper.

The term "paper" as used herein should be interpreted in its broad sense and includes paper in the narrow sense as well as paperboard.

Coated paper obtained by applying a paper coating composition mainly composed of a pigment and an aqueous binder on paper, followed by necessary steps, such as drying and calendering, has been widely used for commercial prints, magazines, books and the like due to its excellent properties such as printed results. With the increasing demand for higher quality and the development of high-speed printing techniques, constant efforts have continued to further improve the coated paper quality. Particularly in the art of offset printing which predominates in various printing techniques, it is an important subject to improve ink receptivity considering the effects of damping water, water resistance such as wet pick, and anti-blister properties at a rotary press.

In order to resolve the above-mentioned problem, it is conventionally known to add a wet strength agent or printing quality improver including melamine-formaldehyde resins, urea-formaldehyde resins, or polyamidepolyurea-formaldehyde resins, such as those disclosed in, for example, JP-B-69-11667 and JP-B-84-32597 (the term "JP-B" as used herein means an "examined published Japanese patent application (KOKOKU)") to the paper coating composition.

Although these conventional wet strength agents or printing quality improvers exhibit effective characteristics, each of them has a serious defect or insufficiency in part of the desired characteristics and is not always satisfactory for practical use.

For example, aminoplast resins, such as melamine-formaldehyde resins and urea-formaldehyde resins, not only cause evolution of formaldehyde from the coating line or resulting coated paper but also produce substantially no effect on improving ink receptivity and anti-blister properties. Besides, as the pH of the coating composition increases, the water resistance improving effect by the aminoplast resins becomes less pronounced. Polyamidepolyurea-formaldehyde resins are effective for improving not only water resistance but also ink receptivity and anti-blister properties. The degree of improvements attainable by them, however, is not necessarily sufficient against the recent demand for higher quality coated paper. Efforts have hence been made for further improvements. For example, improvements are proposed in JP-A-92-100997 and JP-A-92-263696 (the term "JP-A" as used herein means an "unexamined published Japanese patent application (KOKAI)"). Nevertheless, there still has been a need for further enhanced performance to cope with the ever increasing demand for coated paper quality.

An object of the present invention is to provide a paper coating composition which can cope with the demand and endows coated paper with higher qualities such as higher water resistance, ink receptivity and the like than those obtainable by conventional techniques.

The present inventors have conducted extensive investigation and, as a result, have found that a paper coating composition containing specific compounds exhibits excellent performance and have thus completed the present invention.

The present invention provides a paper coating composition which comprises:

(I) a pigment;
(II) an aqueous binder;
(III) a water-soluble resin which is prepared by the reaction of at least,
  (a) an alkylenediamine or a polyalkylenepolyamine,
  (b) an urea compound, and
  (c) a compound selected from the group consisting of aldehydes, epihalohydrins, and $\alpha,\gamma$-dihalo-$\beta$-hydrins; and
(IV) a compound selected from the group consisting
  (f) an amine selected from the group consisting of monoamine having four or more carbon atoms, diamine having four or more carbon atoms, and a salt thereof,
  (g) an organic quaternary ammonium salt, and
  (h) a polyamide obtained by reacting a dibasic carboxylic acid and a polyamine.

A water-soluble resin (III) according to the present invention may be the one prepared by reacting (a), (b), (c), and one or more additional compounds. As the examples of the additional compounds, (d) a dibasic carboxylic acid compound and (e) an alicyclic compounds, such as an alicyclic amine having at least one active hydrogen or alicyclic epoxy compound can be referred to.

The present invention will be explained below in more detail.

Pigments which can be used as component (I) in the present invention may be those which have been commonly used for paper coating. Examples of the pigments include white inorganic pigments, such as kaolin, talc, calcium carbonate (either ground or precipitated), aluminum hydroxide, satin white, titanium oxide and the like; and white organic synthetic pigments, such as polystyrene, melamine-formaldehyde resins, urea-formaldehyde resins and the like. They may be used either individually or in combination of two or more thereof. Organic or inorganic colored pigments may also be used in combination.

Aqueous binders which can be used in the present invention as component (II) may be those which have been commonly used for paper coating. Examples of the pigments include water-soluble binders and aqueous emulsion type binders. Examples of the water-soluble binders include unmodified or modified starches such as oxidized starch and phosphate-esterified starch, polyvinyl alcohol, water-soluble proteins such as casein and gelatin, and modified cellulose such as carboxymethyl-cellulose. Examples of the aqueous emulsion type binders include styrene-butadiene type resins, vinyl acetate resins, ethylene-vinyl acetate resins, and methyl methacrylate resins. These aqueous binders may be used either individually or in combination of two or more thereof.

The water-soluble resin (III) in the present invention is the one which is prepared by reacting, at least, (a) an alkylenediamine or a polyalkylenepolyamine, (b) an urea compound, and (c) a compound selected from the group consisting of aldehydes, epihalohydrins, and $\alpha,\gamma$-dihalo-$\beta$-hydrins.

Examples of (a) the alkylenediamine or polyalkylenepolyamine, which is one of the starting materials for the water-soluble resin (III) include aliphatic diamines such as ethylenediamine, propylene-diamine, 1,3-propanediamine, and hexamethylenediamine; and polyalkylenepolyamine such as diethylene-triamine, triethylenetetramine, tetraethylenepentamine, iminobispropylamine, 3-azahexane-1,6-diamine, and 4,7-diaza-decane-1,10-diamine. Among them, diethylenetriamine and triethylenetetramine are preferred from the industrial viewpoint. These alkylenediamines or polyalkylenepolyamine (a) can be used either individually or in combination of two or more thereof.

Examples of (b) urea compound, which is also a starting material for the water-soluble resin (III) used in the present invention, include urea, thiourea, quanylurea, methylurea, dimethylurea and the like. Among them, urea is preferably used from the industrial viewpoint. These ureas compounds (I) can be used either individually or in combination of two or more thereof.

Examples of aldehyde which is used as a starting material (c) for the water-soluble resin (III) used in the present invention, include formaldehyde; alkylaldehydes, such as acetaldehyde and propylaldehyde; glyoxal; and alkyldialdehydes, such as propanedial and butanedial. Formaldehyde and glyoxal are preferred from the industrial view point. These aldehydes can be used either individually or in combination of two or more thereof.

The epihalohydrin which is used as a starting material (c) for the water-soluble resin (III) used in the present invention is represented by the following formula:

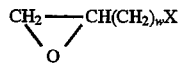

wherein X represents a halogen atom, and w represents an integer of 1, 2 or 3. Preferred examples of the epihalohydrin include epichlorohydrin and epibromohydrin.

The α,γ-dihalo-β-hydrin which is used as a starting material (c) for the water-soluble resin (III) used in the present invention is represented by the following formula:

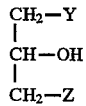

wherein Y and Z each independently represent a halogen atom. Preferred examples of the α,γ-dihalo-β-hydrin include 1,3-dichloro-2-propanol.

These epihalohydrins and α,γ-dihalo-β-hydrins can be used either individually or in combination of two or more thereof.

The aldehyde, epihalohydrin and α,γ-dihalo-β-hydrin to be used to obtain water-soluble resin (III) can be used either alone or in combination of two or more thereof. For example, the aldehyde and the epihalohydrin may be used simultaneously, and also the aldehyde and the α,γ-dihalo-β-hydrin may be used simultaneously.

The water-soluble resin (III) is prepared by reacting, at least, (a) an alkylenediamine or a polyalkylenepolyamine, (b) an urea compound and (c) a compound selected from the group consisting of aldehydes, epihalohydrins and α,γ-dihalo-β-hydrins. The water-soluble resin (III) may be prepared by reacting (a), (b), (c), and one or more additional compounds. Preferable example of the additional compounds include (d) a dibasic carboxylic acid compound and (e) an alicyclic compounds, such as an alicyclic amine having at least one active hydrogen or an alicyclic epoxy compound.

The dibasic carboxylic acid compound (d) is a compound having two carboxylic groups or derivatives thereof. As the dibasic carboxylic acid compound (d), not only its free acid but also its ester, its acid anhydride and the like can be used. The dibasic carboxylic acid compound (d) may be an aliphatic, aromatic or alicyclic compound. As the example of the dibasic carboxylic acid compound (d), an aliphatic dicarboxylic acid, such as succinic acid, glutaric acid, adipic acid, sebacic acid, maleic acid, fumaric acid, dimer acid of linoleic acid and the like; aromatic dicarboxylic acid, such as phthalic acid, isophthalic acid, terephthalic acid and the like; and an alicyclic dicarboxylic acid, such as tetrahydrophthalic acid, hexahydrophthalic acid, cyclohexane-1,3-dicarboxylic acid, cyclohexane-1,4-dicarboxylic acid, cyclopentanedicarboxylic acid, 3-methyltetrahydrophthalic acid, 4-methyltetrahydrophthalic acid, 3-methylhexahydrophthalic acid, 4-methylhexahydrophthalic acid and the like can be referred to.

As examples of the ester of the dibasic carboxylic acid (d), its mono- and diester with a lower alcohol and its polyester with a glycol can be referred to.

When the dibasic carboxylic acid compound (d) is an aliphatic compound, the compound having 4 to about 36 carbon atoms is usually used. The alicyclic compound used as (d) may have an unsaturated bond. In this specification, if the position of the unsaturated bond is not mentioned, the alicyclic compound includes any of the compound having the unsaturated bond at any position.

When the dibasic carboxylic acid compound (d) is an alicyclic compound, its acid anhydride can also be used preferably. Examples of the acid anhydride include tetrahydrophthalic anhydride, hexahydrophthalic anhydride, 3-methyltetrahydrophthalic anhydride, 4-methyltetrahydrophthalic anhydride, 3-methylhexahydrophthalic anhydride, 4-methylhexahydrophthalic anhydride and the like.

When the dibasic carboxylic acid compound (d) is an alicyclic compound, a polyester having two carboxylic acid groups such as a reaction product of a dibasic carboxylic acid and a glycol is preferably used as (d). Particularly preferable is the polyester having a free carboxylic acid group. Examples of the glycol include alkylene glycol, such as ethyleneglycol, propyleneglycol and butanediol; cycloalkylene glycol, such as cyclopentanediol and cyclohexanediol; alkenylene glycol, such as butenediol and octenediol; polyalkylene glycol, such as diethyleneglycol, dipropyleneglycol, triethyleneglycol, polyethylenglycol and polytetramethylenglycol; addition compound of bisphenol A and ethylene oxide; and addition compound of hydrogenated bisphenol A and ethylene oxide. The polyester having carboxylic acid groups at the ends of its molecular chain can be obtained by reacting a dibasic carboxylic acid and a glycol using an excess in mole of the carboxylic acid. The dibasic carboxylic acid compound (d) can be used individually or in combination of two or more.

The alicyclic amine having at least one active hydrogen atom used as (e) is usually a compound which has a alicyclic ring having 5 to 12 carbon atoms, preferably cyclohexane ring, and at least one primary or secondary amino group. The amino group may be linked to the alicyclic ring either directly or through a linking group, such as alkylene. Example of the alicyclic amine having at least one active hydrogen atom include cyclohexyl amine, dicyclohexyl amine, 1,3-diaminocyclohexane, 1,4-diaminocyclohexane, 4,4'-diamino-3,3'-dimethyldicyclohexylmethane, 4,4'-diamino-3,3'-dimethylbicyclohexane, isophoronediamine, 1,3-bis(aminomethyl)cyclohexane, 1,2-bis(aminomethyl) cyclohexane, 1,4-bis(aminomethyl)cyclohexane, N-aminopropylcyclohexylamine, 1,5-bis(aminomethyl) octahydro-4,7-methanoindene, 2,6-bis(aminomethyl) octahydro-4,7-methanoindene, 2,2-bis(4-aminocyclohexyl) propane, bis(4-aminocyclohexyl)methane, 4,4'-oxybis (cyclohexylamine), 4,4'-sulfonbis(cyclohexylamine), 1,3,5- triaminocyclohexane, 2,4'-diamino-3,3',5,5'-tetramethyldicyclohexylmethane, 4,4'-diamino-3,3',5,5'-tetramethyldicyclohexylmethane, and methanediamine. The alicyclic amine can be used either individually or in combination of two or more.

The alicyclic epoxy compound used as (e) is usually a compound which has a alicyclic ring having 5 to 12 carbon atoms, preferably cyclohexane ring, and an epoxy group linked to the alicyclic ring either directly or indirectly. Example of the alicyclic epoxy compound include cyclohexene oxide, vinyl cyclohexene dioxide, bis(3,4-epoxycyclohexyl)adipate, 3,4-epoxycyclohexanecarboxylate, 3-(3,4-epoxycyclohexyl)-8,9-epoxy-2,4-dioxaspiro[5,5]undecane, diglycidyl, hexahydrophthalate, 2,2-bis(4-glycidyloxycyclohexyl) propane and the like. The alicyclic epoxy compound can be used either individually or in combination of two or more. The alicyclic amine And the alicyclic epoxy compound can be used in combination.

As one of the preferable example of the alkali soluble compound (III), the one obtained by reacting (a) an alkylenediamine or a polyalkylenepolyamine, (b) an urea compound, (c) a compound selected from the group consisting of aldehydes, epihalohydrins and α,γ-dihalo-β-hydrins and, if desired, (e) an alicyclic compounds selected from the group consisting of an alicyclic amine having at least one active hydrogen and an alicyclic epoxy compound can be referred to.

In the reaction to obtain the above-mentioned alkali soluble compound (III), the reaction order among (a), (b) and (c) or (a), (b), (c) and (e) is not critical. As an example of the reaction manner, following can be mentioned:

An alkylenediamine or a polyalkylenepolyamine (a) and an urea compound (b) are subjected to a deammoniation reaction (hereinafter referred to as reaction 1), followed by reaction with a compound selected from the group consisting of aldehydes, epihalohydrins and α,γ-dihalo-β-hydrins (c) (hereinafter the reaction following the reaction 1 will be referred to as reaction 2). When the alicyclic compounds (e) is also used as the starting material of the reaction, one or more kinds of (e) are allowed to react with other starting material, i.e. (a), (b) or (c), during the reaction 1 and/or the reaction 2.

In the reaction 1, the urea compound (b) may be added at one time to react with (a). Two step reaction in which a part of (b) is added to react with (a) at first, followed by adding remaining (b) to conduct deammoniation reaction is also possible. When an aldehyde is used as (c) in the reaction 2, it is preferred to conduct the reaction under an acidic condition or it is also preferred to conduct the reaction under an alkaline condition at first, followed by the reaction under an acidic condition. When an epihalohydrin and/or an α,γ-dihalo-β-hydrins aldehyde are used as (c) in the reaction 2, it is preferred to conduct the reaction under an weekly acidic or an alkaline condition, for example pH 5 or higher and more preferred is at pH 6 to 9.

These reactions can be conducted according to known manners. For example, the reaction using (a), (b) and (c) as the starting materials is mentioned in JP-A-92-100997, and the reaction using (e) as the starting material in addition to (a), (b) and (c) is mentioned in JP-A-92-263696 and JP-A-92-333697.

As another preferable example of the alkali soluble compound (III), one obtained by reacting (a) an alkylenediamine or a polyalkylenepolyamine, (b) an urea compound, (c) a compound selected from the group consisting of aldehydes, epihalohydrins and α,γ-dihalo-β-hydrins, (d) a dibasic carboxylic acid compound and, if desired, (e) an alicyclic compounds selected from the group consisting of an alicyclic amine hating at least one active hydrogen and an alicyclic epoxy compound can be referred to.

In the reaction to obtain the above-mentioned alkali soluble compound (III), the reaction order among (a) through (d) or (e) is not critical. As an example of the reaction manner, following can be mentioned:

An alkylenediamine or a polyalkylenepolyamine as (a), (b) an urea compound and (d) a dibasic carboxylic acid compound are subjected to a deammoniation reaction and dehydration (hereinafter referred to as reaction 3) to produce a polyamidepolyurea, followed by reaction with (c) a compound selected from the group consisting of aldehydes, epihalohydrins and α,γ-dihalo-β-hydrins (hereinafter the reaction following the reaction 3 will be referred to as reaction 4). When (e) the alicyclic compounds is also used as the starting material of the reaction, one or more kinds of (e) are allowed to react with other starting material, i.e. (a), (b), (c) or (d), during the reaction 3 and/or the reaction 4.

As examples of the manner to conduct the reaction 3, following can be mentioned:

The urea compound (b) is added at one time to be subjected to the reaction.

A part of (b) is added at first to conduct deammoniation reaction, followed by adding remaining (b) to conduct deammoniation reaction again.

Dehydration is conducted between (a) and (d), followed by deammoniation with (b).

A part of (b) is subjected to a deammoniation reaction with (a) and then the resulting compound is subjected to a dehydration with (d), followed by a dehydration with remaining (b).

(a), (d) and a part of (b) are subjected to dehydration and deammoniation simultaneously, followed by a deammoniation with remaining (b).

When an aldehyde is used as (c) in the reaction 4, it is preferred to conduct the reaction under an acidic condition or it is also preferred to conduct the reaction under an alkaline condition at first, followed by the reaction under an acidic condition. When an epihalohydrin and/or an α,γ-dihalo-β-hydrins aldehyde are used as (c) in the reaction 4, it is preferred to conduct the reaction under an weekly acidic or an alkaline condition, for example pH 5 or higher and more preferred is at pH 6 to 9.

These reactions can be conducted according to known manners. For example, the reaction using (a), (b), (c) and (d) as the starting materials is mentioned in JP-A-80-31837, JP-A-82-167315, JP-A-87-104995, JP-A-87-125092, JP-A-87-125093, etc., and the reaction using (e) as the starting material in addition to (a), (b), (c) and (d) is mentioned in JP-A-90-216297 and JP-A-90-221498.

The paper coating composition of the present invention further comprises (IV) a compound selected from the group consisting of (f) an amine selected from the group consisting of monoamine having four or more carbon atoms, diamine having four or more carbon atoms and a salt thereof, (g) an organic quaternary ammonium salts, and (h) a polyamide obtained by reacting a dibasic carboxylic acid and polyamine, in addition to the pigment (I), the aqueous binder (II), and the water-soluble resin (III).

The amine (f) is selected from the group consisting of monoamine, diamine which have four or more carbon atoms, and a salt thereof. Among them the amine having 5 or more carbon atoms is preferred. A primary, a secondary, and a tertiary amine can be used as (f) the amine. An aliphatic, aromatic, alicyclic and cyclic amine can be used as (f) the amine.

Examples of the primary amine include an aliphatic monoamine, such as butylamine, pentylamine, hexylamine, octylamine, isobutylamine, 2-ethylhexylamine, and the like; an alicyclic monoamine, such as cyclohexyl amine, aminomethylcyclohexane and the like; and an aromatic monoamine, such as aniline, toluidine, benzylamine, naphthylamine, m-aminophenol, and the like.

Examples of the secondary amine include a monoamine having an aliphatic, aromatic or alicyclic group and a cyclic monoamine, such as dipropaneamine, dicyclohexylamine, N-methylcyclohexylamine, N-methylaniline, pyrrolizidine, piperidine, and the like.

Examples of the tertiary amine include a monoamine having an aliphatic, aromatic or alicyclic group and a cyclic monoamine, such as triethylamine, tributylamine, N,N-dimethyl-n-propylamine, N,N-dimethylcyclohexylamine, N,N-dimethylaniline, pyridine, and the like.

The diamine includes a compound having two primary amino groups, a compound having two secondary amino groups, a compound having two tertiary amino groups and a compound having two amino groups in which their substitution number are different each other. Examples of preferred diamine include an aromatic diamine, alicyclic diamine and a diamine having a cyclic amino group. As the preferred diamine, for example, an alicyclic and aromatic amine having two primary amino groups, such as 1,3-diaminocyclohexane, isophoronediamine, 1,3-bis(aminomethyl)cyclohexane, bis(4-aminocyclohexyl)methane, 2,2-bis(4-aminocyclohexyl)propane, methanediamine, 4,4'-oxybis(cyclohexylamine), 4,4'-sulfonbis(cyclohexylamine), phenylenediamine, tolylenediamine, xylylenediamine and the like; a compound having two amino groups wherein substitution numbers of the amino groups are different, such as 3-methylaminomethyl-3,5,5-trimethylcyclohexylamine, 1-methylamino-3-aminomethyl-3,5,5-trimethylcyclohexylamine, 1-aminomethyl-3-methylaminomethylcyclohexane, 1-aminomethyl-3-dimethylaminomethylcyclohexane, 1-methylaminomethyl-3-dimethylaminomethylcyclohexane, 4-aminopyridine and the like; a compound having two secondary amino groups, such as N,N'-dimethylisophoronediamine, 1,3-bis(methylaminomethyl)cyclohexane and the like; and a compound having two tertiary amino groups, such as N,N'-tetramethylisophoronediamine, 1,3-bis(dimethylaminomethyl)cyclohexane and the like can be referred to.

An inorganic acid salt and an organic acid salt of above-mentioned monoamine and diamine can be used as (f) the amine. As examples of the inorganic acid, hydrochloric acid, sulfuric acid, phosphoric acid and the like can be referred to. As examples of the organic acid, acetic acid, formic acid, oxalic acid and the like can be referred to.

These amines can be used either individually or in combination of two or more.

As (g) the organic quaternaryammonium salt, any compound having at least one quaternary nitrogen can be used. Examples of (g) include a compound having a quaternary nitrogen linked to four hydrocarbon groups, a compound having a quaternary nitrogen in its ring, etc. The number of the quaternary nitrogen is not restricted. A mono-quaternaryammonium salt having one quaternary nitrogen, a di-quaternaryammonium salt having two quaternary nitrogen and a quaternaryammonium salts having three or more quaternary nitrogen can be used. From the economical view point or considering availability, a mono- or di-quaternaryammonium salt is preferred and particularly preferred is a mono-quaternaryammonium salt.

Among (g) the organic quaternaryammonium salt, a mono- or di-quaternaryammonium salt having a quaternary nitrogen linked to four hydrocarbon groups wherein at least two of the hydrocarbon groups are independently $C_1$-$C_3$ alkyl or alkylene is commonly used.

In the case of a mono-quaternaryammonium salt, all of the four hydrocarbon groups linked to the quaternary nitrogen may be independently $C_1$-$C_3$ alkyl. It is also possible that two or three of the four hydrocarbon groups are $C_1$-$C_3$ alkyl and remaining one or two are hydrocarbon groups having relatively large number of carbon atoms.

In the case of a di-quaternaryammonium salt, the number of carbon atoms of the group linking the two quaternary nitrogen (hereinafter the group will be referred to as linking group) is not restricted, and the linking group may contain an alicyclic group or an aromatic group. When the linking group is $C_1$-$C_3$ alkylene, the hydrocarbon groups linked to the quaternary nitrogen but not being the linking group are not restricted, provided that at least one $C_1$-$C_3$ alkyl is linked to each of the quaternary nitrogen. When the linking group is $C_1$-$C_3$ alkylene, not more than two of the hydrocarbon groups which are linked to the quaternary nitrogen but not the linking group may be independently hydrocarbon groups having relatively large number of carbon atoms. When the linking group is not $C_1$-$C_3$ alkylene, the hydrocarbon groups linked to the quaternary nitrogen but not being the linking group are not restricted, provided that at least two $C_1$-$C_3$ alkyl are linked to each quaternary nitrogen. When the linking group is not $C_1$-$C_3$ alkylene, not more than one of the hydrocarbon groups linked to each of the quaternary nitrogen but not being the linking group may be a hydrocarbon group having relatively large number of carbon atoms.

The hydrocarbon groups having relatively large number of carbon atoms in the above-mentioned mono- or di-quaternary ammonium salt may be an aliphatic group, an alicyclic group or a group having aromatic ring.

The anion forming the quaternary ammonium salt may be either an inorganic acid ion or an organic acid ion. As the inorganic acid ion, for example, chlorine ion, bromine ion, sulfuric acid ion, phosphoric acid ion, and the like can be mentioned. As the organic acid ion, for example, acetic acid ion, formic acid ion, oxalic acid ion, and the like can be mentioned.

Examples of the mono-quaternary ammonium salt used in the present invention include a quaternary ammonium salt having relatively large number of carbon atoms, such as diallyldimethylammoniumchloride, hexyltrimethylammoniumchloride, cyclohexyltrimethylammoniumchloride, cyclohexylmethyltrimethylammoniumchloride, and the like; a compound generally known as an aliphatic cationic surfactant, such as octyltrimethylammoniumchloride, 2-ethylhexyltrimethylammoniumbromide, decyltrimethylammoniumchloride, lauryltrimethylammoniumchloride, stearyltrimethylammoniumchloride, laurylstearyldimethylammoniumchloride, hexadecyltrimethylammoniumchloride, diheptadecyldimethylammoniumchloride, distearyldimethylammoniumchloride, and the like; and a compound generally known as an aromatic cationic surfactant, such as lauryldimethylbenzylammoniumchloride, stearyldimethylbenzylammoniumchloride, stearyldiethylbenzylammoniumchloride, tetradecyldimethylbenzylammoniumchloride, palm alkyldimethylbenzylammoniumchloride, and the like.

Among the mono-quaternary ammonium salt, preferred is a compound having a quaternary nitrogen wherein two or three of the hydrocarbon groups linked to the nitrogen are independently $C_1$–$C_3$ alkyl and remaining one or two are aliphatic or aromatic hydrocarbon groups having 3 to 24 carbon atoms.

The aliphatic hydrocarbon groups include alkyl, alkenyl, alkyl having a ring, and the like. The aromatic hydrocarbon groups include benzyl, phenetyl and the like. A compound having a quaternary nitrogen wherein three of the hydrocarbon groups linked to the nitrogen are independently methyl or ethyl and remaining one is aliphatic hydrocarbon groups having 3 to 24 carbon atoms is more preferable, and a compound having a quaternary nitrogen wherein three of the hydrocarbon groups are methyl and remaining one is alkyl having 8 to 12 carbon atoms is particularly preferable.

Preferred examples of the mono-quaternary ammonium salt used in the present invention include octyltrimethylammoniumchloride, decyltrimethylammoniumchloride, lauryltrimethylammoniumchloride and the like.

Examples of the di-quaternary ammonium salt used in the present invention include a 1,3-bis(trimethylammoniomethyl)cyclohexanedichloride, N,N,N,N',N',N'-hexamethylisophoronediammoniumdibromide, N-beef-tallow alkyl-N,N,N',N',N'-pentamethyltrimethylenediammoniumdichloride and the like.

These organic quaternary ammonium salt (g) can be used individually or in combination of two or more.

The polyamide (h) is obtained by reacting a dibasic carboxylic acid (i) and a polyamine (j).

The dibasic carboxylic acid (i) is a compound having two carboxylic groups and derivatives thereof. The dibasic carboxylic acid (i) which can be used as the starting materials for the polyamide (h) include its free acid, its ester, its acid anhydride and the like. Examples of (i) the dibasic carboxylic acid include compounds mentioned above as (d), i.e., an aliphatic, aromatic and alicyclic dicarboxylic acid, a mono- and diester of one of the dicarboxylic acids with a lower alcohol, an acid anhydride of one of the dicarboxylic acids and a polyester made from one of the dicarboxylic acids and a glycol. Among them, a polyester having free carboxylic acid group is preferred. Among the polyester, a polyester which polymerization degree is 20 or less is preferred.

The dibasic carboxylic acid (i) can be used individually or in combination of two or more.

As the polyamine (j), amines having two or more primary and/or secondary amino groups, such as an aliphatic amine same as (a) the alkylenediamine or polyalkylenepolyamine used as the starting compound for preparing the water-soluble resin (III), an alicyclic polyamine, an aromatic polyamine and the like can be mentioned. Among them, an alicyclic diamine is preferred. These amines can be used individually or in combination of two or more.

As the alicyclic diamine, a compound which have an alicyclic ring having about 5 to 12 carbon atoms, preferably cyclohexane ring, and two primary and/or secondary amino groups can be mentioned. The amino group may be linked to the alicyclic ring directly or it may be linked to the alicyclic ring indirectly through a linking group, such as alkylene. A compound, wherein one amino group (1) is linked to the alicyclic ring directly or indirectly and another amino group is an aminoalkyl group and linked to the amino group (1), can also be used.

Examples of the aliphatic diamine include diaminocyclohexane, isophoronediamine, bis(aminomethyl) cyclohexane, bis(4-aminocyclohexyl)methane, 2,2-bis(4-aminocyclohexyl)propane, methanediamine, 4,4'-oxybis(cyclohexylamine), 4,4'-sulfonbis(cyclohexylamine), 4,4'-diamino-3,3'-dimethyldicyclohexylmethane, 4,4'-diamino-3,3'-dimethyldicyclohexane, N-aminopropylcyclohexylamine, 1,5-bis(aminomethyl) octahydro-4,7-methanoindene, 2,6-bis(aminomethyl) octahydro-4,7-methanoindene, 2,4'-diamino-3,3',5,5'-tetramethyldicyclohexylmethane, 4,4'-diamino-3,3',5,5'-tetramethyldicyclohexylmethane and the like.

The aromatic diamine is a compound which has at least one aromatic ring and two amino groups selected from the group consisting of a primary and secondary amino groups. Examples of the aromatic diamine include xylilene diamine, 4,4'-diaminodiphenylmethane, 4,4'-diamino-3,3'-dimethyldiphenylmethane, N-aminopropylaniline, 2,4'-diamino-3,3',5,5'-tetramethyldiphenylmethane and the like.

The physical properties of the polyamide (h), such as solubility to an aqueous solvent, crystallinability, vary based on (i) the dibasic carboxylic acid and (j) the polyamine used as the starting materials of the polyamide (h). Hence, they can be adjusted by selecting the starting materials.

The polyamide (h) can be obtained by reacting (i) the dibasic carboxylic acid and (j) the polyamine at 100° to 250° C., preferably at 130° to 200° C., for 2 to 12 hours with removing the water generated in the reaction. The amount of the dibasic carboxylic acid is, preferably, 0.5 to 1 mole per 1 mole of the polyamide. The reaction can be conducted either in the absence or in the presence of an acid catalyst, such as hydrochloric acid, sulfuric acid, phosphoric acid, formic acid, acetic acid. The polyamide (h) preferably has a viscosity of from 20 to 1,000 cps at 25° C. in its aqueous solution of 60% by weight. Particularly preferably, the viscosity is from 50 to 5,000 cps.

The polyamide (h) can be used individually or in combination of two or more.

The ratio of amounts of the pigment (I) to the aqueous binder (II) in the paper coating composition of the present invention is determined same as in a conventional the paper coating composition in accordance with the aim or the usage.

Aqueous binder (II) contained in the paper coating composition of the present invention is used preferably in an amount of from 5 to 200 parts by weight, more preferably from 10 to 50 parts by weight, per 100 parts by weight of pigment (I). The water-soluble resin (III) is used preferably in an amount of from 0.05 to 5 parts by weight, more preferably from 0.1 to 2 parts by weight, per 100 parts by weight of pigment (I).

The amount of the compound (IV) used in the paper coating composition is as follows.

When the compound (IV) is (f) the amine, the amount of the amine is preferably about from 1 to 50 weight %, more preferably about from 5 to 20 weight %, based on the weight of the solid content of the water-soluble resin (III).

When the compound (IV) is (g) the organic quaternary ammonium salts, the amount of (g) is preferably about from 1 to 90 weight %, more preferably about from 3 to 80 weight %, based on the weight of the solid content of the water-soluble resin (III).

When the compound (IV) is (h) the polyamide, the amount of the polyamide is preferably about from 1 to 90 weight %, more preferably about from 3 to 80 weight %, based on the weight of the solid content of the water-soluble resin In the preparation of the paper coating composition of the present invention, the water-soluble resin (III) and the compound (IV) may be previously mixed, followed by being admixed with the pigment (I) and aqueous binder (II) to prepare of the composition, or (III) and (IV) may be individually admixed with the pigment (I) and aqueous binder (II). The effects of the present invention can be achieved as well by previously admixing the water-soluble resin (III) and the compound (IV), either as a mixture of (III) and (IV) or each individually, with either a pigment (I) slurry or an aqueous binder (II) and then incorporating the resulting mixture with other components.

If desired, the paper coating composition of the present invention may further contain other components, such as dispersing agents, viscosity or fluidity regulators, defoaming agents, antiseptics, lubricants, water retaining agents, and colorants including dyes and colored pigments.

The paper coating composition of the present invention can be applied on a paper substrate by any of known coating means, such as blade coater, air knife coater, bar coater, size press coater, gate roll coater, and cast coater. After coating, the paper is subjected to drying as required. If desired, the coated paper is subjected to a surface smoothening treatment by a supercalender, etc.

Since the paper coating composition of the present invention further contains the compound (IV), the coated paper obtained by using it exhibits improved properties comparing the coated paper obtained by using a paper coating composition consisting of a pigment (I), an aqueous binder (II) and a water-soluble resin (III).

The present invention is now illustrated in greater detail with reference to Reference Examples and Examples, but it should be understood that the present invention is not deemed to be limited thereto. All the percents, parts and ratios are by weight unless otherwise indicated. In the Reference Examples and Examples, viscosities and pH were measured at 25° C.

Reference Example 1

In a four-necked flask equipped with a thermometer, a reflux condenser and a stirring rod, 146.2 g (1.0 mol) of triethylenetetramine and 30.0 g (0.5 mol) of urea were charged, and the mixture was heated at an inner temperature of 140° to 160° C. for 3.5 hours to effect deammoniation. Thereafter, 73.1 g (0.5 mol) of adipic acid was charged thereto and a dehydrate-amidation was conducted for 5 hours while keeping the inner temperature at 150° to 160° C. Then the inner temperature was lowered to 130° C., 120.1 g (2.0 mol) of urea was charged thereto and a deammoniation was conducted for 2 hours at an inner temperature of 120° to 130° C. Thereafter, 270 g of water was added thereto to prepare an aqueous resin solution. To the solution 60.9 g (0.75 mol) of 37% formalin was added. The resulting system was adjusted to pH 4 to 5 with 70% sulfuric acid and was allowed to react at an inner temperature of 70° C. for 4 hours. The reaction system was then adjusted to pH 4 to 5 with an aqueous sodium hydroxide solution and was allowed to react at an inner temperature of 70° C. for 4 hours. Thereafter, the resulting system was adjusted to pH 6.5 and the concentration of 50% with an aqueous sodium hydroxide solution to obtain 675 g of an aqueous water-soluble resin solution having a viscosity of 140 cps.

Reference Example 2

In the same apparatus as used in Reference Example 1, 58.5 g (0.4 mol) of triethylenetetramine and 12.0 g (0.2 mol) of urea were charged, and the mixture was heated at an inner temperature of 120°–140° C. for 3 hours to effect deammoniation. Thereafter, 34.4 g (0.2 mol) of hexahydrophtharic acid was charged thereto and a dehydrate-amidation was conducted for 5 hours at an inner temperature of 150° to 160° C. Then the inner temperature was lowered to 130° C., 48.0 g (0.8 mol) of urea was charged thereto and a deammoniation was conducted for 2 hours at an inner temperature of 120° to 130° C. After completion of the reaction, the inner temperature was lowered to 100° C., 108 g of water was added thereto to prepare an aqueous resin solution. To the solution 32.4 g (0.4 mol) of 37% formalin was added, and the resulting system was adjusted to pH 5.1 with 70% sulfuric acid. After elevating the inner temperature to 60° C., the reaction system was allowed to react for 5 hours, and then cooled. Thereafter, the resulting system was neutralized with 28% an aqueous sodium hydroxide solution to obtain 275 g of an aqueous water-soluble resin solution having a viscosity of 45 cps, pH of 7.1 and a concentration of 50%.

Reference Example 3

In the same apparatus as used in Reference Example 1, 146.2 g (1.0 mol) of triethylenetetramine and 180.2 g (3.0 mol) of urea were charged, and the mixture was heated at an inner temperature of 120° to 140° C. for 2 hours to effect deammoniation. Thereafter, 150 g of water was added thereto to prepare an aqueous resin solution. To the solution 56.8 g (0.7 mol) of 37% formalin was added, and the resulting system was allowed to react for 4 hours at an inner temperature of 70° C. Then the system was adjusted to pH 4.0 with 70% sulfuric acid, and the reaction system was allowed to react for 4 hours while keeping the inner temperature at 70° C. Thereafter, the resulting system was adjusted to pH 7.0 with an aqueous sodium hydroxide solution to obtain 515 g of an aqueous water-soluble resin solution having a viscosity of 350 cps and a concentration of 60%.

Reference Example 4

In a four-necked flask equipped with a thermometer, a Liebig condenser and a stirring rod, 142 g (1.0 mol) of 1,3-bis(aminomethyl)cyclohexane and 73.0 g (0.5 mol) of adipic acid were charged, and a dehydrate-amidation was conducted for 5 hours while keeping the inner temperature at 150° to 160° C. After completion of the reaction, water was added thereto to obtain 338 of an aqueous polyamide solution having a viscosity of 400 cps and a concentration of 60%.

Reference Example 5

In the same apparatus as used in Reference Example 4, 170.2 g (1.0 mol) of isophorone diamine and 50 g (0.5 mol) of succinic anhydride were charged, and a dehydrate-amidation was conducted for 5 hours while keeping the inner temperature at 150° to 160° C. After completion of the reaction, water was added thereto to obtain 357 g of an aqueous polyamide solution having a viscosity of 450 cps and a concentration of 60%.

Reference Example 6

In the same apparatus as used in Reference Example 4, 74.2 g (1.0 mol) of 1,3-propanediamine and 83.1 g (0.5 mol) of a mixture of 3-methyl-1,2,3,6-tetrahydrophthalicanhydride and 4-methyl-1,2,3,6-tetrahydrophthalicanhydride were charged, and a dehydrate-amidation was conducted for 5 hours while keeping the inner temperature at 150° to 155° C. After completion of the reaction, water was added thereto to obtain 247.2 g of an aqueous polyamide solution having a concentration of 60%.

Reference Example 7

In the same apparatus as used in Reference Example 4, 116.2 g (1.0 mol) of hexamethylenediamine and 83.1 g (0.5 mol) of a mixture of 3-methyl-1,2,3,6-tetrahydrophthalicanhydride and 4-methyl-1,2,3,6-tetrahydrophthalicanhydride were charged, and a dehydrate-amidation was conducted for 5 hours while keeping the inner temperature at 150° to 155° C. After completion of the reaction, water was added thereto to obtain 317.2 g of an aqueous polyamide solution having a concentration of 60%.

Reference Example 8

In the same apparatus as used in Reference Example 4, 103.2 g (1.0 mol) of diethylenetriamine and 73.1 g (0.5 mol) of adipic acid were charged, and a dehydrate-amidation was conducted for 5 hours while keeping the inner temperature at 150° to 155° C. Thereafter, 152.1 g (1.0 mol) of 1,2,3,6-tetrahydrophthalicanhydride and 60.1 g (1.0 mol) of ethylene diamine were charged, and a dehydrate-amidation was conducted for 5 hours while keeping the inner temperature at 150° to 155° C. After completion of the reaction, water was added thereto to obtain 587.5 g of an aqueous polyamide solution having a concentration of 60%.

Reference Example 9

In the same apparatus as used in Reference Example 4, 60.1 g (1.0 mol) of ethylenediamine and 87.1 g (0.5 mol) of dimethyladipate were charged, and a demethanolation was conducted for 6 hours while keeping the inner temperature at 110° C. After completion of the reaction, water was added thereto to obtain 194.2 g of an aqueous polyamide solution having a concentration of 60%.

Reference Example 10

In the same apparatus as used in Reference Example 4, 103.2 g (1.0 mol) of diethylenetriamine, 60.1 g (1.0 mol) of ethylenediamine and 202.3 g (1.0 mol) of sebacic acid were charged and a dehydrate-amidation was conducted for 5 hours while keeping the inner temperature at 150° to 155° C. After completion of the reaction, water was added thereto to obtain 549.3 g of an aqueous polyamide solution having a concentration of 60%.

Reference Example 11

A master color having the formulation (solid base) described in the following Table 1 was prepared.

TABLE 1

| | (Master Color) | |
|---|---|---|
| Component | | Ration |
| Pigment: | Ultrawhite 90[1] | 70 parts |
| | Carbital 90[2] | 30 parts |
| Dispersing Agent: | Sumirez Resin DS-10[3] | 0.2 part |
| Aqueous Binder: | SN-307[4] | 12 parts |
| | Cji Ace A[5] | 4 parts |

Note:
[1] Clay produced by Engel Hard Minerals and Chemical Division Inc., U.S.A.
[2] Calcium carbonate produced by Fuji Kaolin Co., Ltd., Japan
[3] Polyacrylic acid type pigment dispersant produced by Sumitomo Chemical Co., Ltd., Japan
[4] Styrene-butadiene latex produced by Sumitomo Naugatuck Co., Ltd., Japan
[5] Oxidized starch produced by Oji National Co., Ltd., Japan
In the Table 1, the Ratio is based on solid content.

EXAMPLE 1

By adding 5.6 g of cyclohexylamine into 225 g of the aqueous resin solution obtained in Reference Example 1, the amount of the former being 5% of the latter based on the solid content, a resin solution having the viscosity of 138 cps was obtained. The resin solution thus obtained was added to the master color prepared in Reference Example 11 in the ratio of the solid content of the resin to the pigment being 0.5 to 100.

EXAMPLE 2

By adding 22.5 g of 1,3-bis(aminomethyl)cyclohexane into 225 g of the aqueous resin solution obtained in Reference Example 1, the amount of the former being 20% of the latter based on the solid content, a resin solution having the viscosity of 135 cps was obtained. The resin solution thus obtained was added to the master color prepared in Reference Example 11 in the ratio of the solid content of the resin to the pigment being 0.5 to 100.

EXAMPLE 3

By adding 12.5 g of cyclohexylamine into 125 g of the aqueous resin solution obtained in Reference Example 2, the amount of the former being 20% of the latter based on the solid content, a resin solution having the viscosity of 43 cps was obtained. The resin solution thus obtained was added to the master color prepared in Reference Example 11 in the ratio of the solid content of the resin to the pigment being 0.5 to 100.

EXAMPLE 4

By adding 3.6 g of isophoronediamine into 145 g of the aqueous resin solution obtained in Reference Example 2, the amount of the former being 5% of the latter based on the solid content, a resin solution having the viscosity of 44 cps was obtained. The resin solution thus obtained was added to the master color prepared in Reference Example 11 in the ratio of the solid content of the resin to the pigment being 0.5 to 100.

EXAMPLE 5

The aqueous resin solution obtained in Reference Example 3 and isophoronediamine were individually added to the master color prepared in Reference Example 11 in the ratio of the solid content of the resin to the pigment being 0.4 to 100 and isophoronediamine to the pigment being 0.1 to 100.

EXAMPLE 6

By adding 5.2 g of 1,3-bis(aminomethyl)cyclohexane into 172 g of the aqueous resin solution obtained in Reference Example 3, the amount of the former being 5% of the latter based on the solid content, a resin solution having the viscosity of 349 cps was obtained. The resin solution thus obtained was added to the master color prepared in Reference Example 11 in the ratio of the solid content of the resin to the pigment being 0.5 to 100.

EXAMPLE 7

The paper coating compositions prepared in Examples 1 to 6 were adjusted so as to have a total solids content of 60% and a pH of about 9.0 by addition of water and an aqueous 10% sodium hydroxide solution. The physical properties of the thus prepared compositions were measured according to the following methods and the properties thus measured are shown in Table 2 bellow.
1) pH The pH was measured by using a glass electrode hydrogen ion concentration meter manufactured by Toa Denpa Kogyo Co. Ltd. at 25° C. immediately after having prepared the composition.

2) viscosity

The viscosity was measured by using a BL type viscometer manufactured by Tokyo Keiki Co. Ltd. at 60 rpm. and at 25° C. immediately after having prepared the composition.

The thus prepared composition was applied by using a wire rod on one or both sides of fine paper having a basis weight of 80 g/m$^2$ at a single spread of 14 g/m$^2$. The paper was immediately subjected to drying in hot air at 120° C. for 30 seconds, then to moisture-conditioning at 20° C. under a relative humidity of 65% for 16 hours, and thereafter to supercalendering twice at 60° C. and under a linear pressure of 60 kg/cm to obtain coated paper.

Water resistance and ink receptivity of the resulting coated paper were evaluated in accordance with the following test methods. The results obtained are shown in Table 2 below.

3) Water Resistance: (Wet Pick Method: WP )

The coated surface was wetted with a water-supply roll and printed by means of an RI tester (manufactured by Akira Seisakusho Co., Ltd.). The picking was visually observed to evaluate water resistance according to five ratings of from 1 (poor) to 5 (excellent).

4) Ink Receptivity:

4-1) Method A:

The coated surface was wetted with a water-supply roll and printed by means of the RI tester. Ink receptivity was visually evaluated according to five ratings of from 1 (poor) to 5 (excellent).

4-2) Method B:

Printing was carried out while incorporating water into ink by means of the RI tester. Ink receptivity was visually evaluated according to five ratings of from 1 (poor) to 5 (excellent).

TABLE 2

| Resin (Example No.) | 1 | 2 | 3 | 4 | 5 | 6 |
|---|---|---|---|---|---|---|
| Physical Properties of Coating Composition: | | | | | | |
| pH (25° C.) | 9.2 | 9.3 | 9.0 | 9.2 | 9.1 | 9.1 |
| Viscosity (25° C.) (cps) | 1,820 | 1,850 | 1,880 | 1,790 | 1,770 | 1,760 |
| Coated Paper: | | | | | | |
| Water resistance: | | | | | | |
| WP method | 4.0 | 4.0 | 4.5 | 4.0 | 4.3 | 4.0 |
| Ink receptivity: | | | | | | |
| Method A | 3.8 | 4.5 | 4.5 | 4.0 | 4.5 | 4.3 |
| Method B | 3.7 | 4.2 | 4.0 | 3.9 | 4.2 | 4.2 |

EXAMPLE 8

By adding 5.6 g of cyclohexyltrimethylammoniumchloride into 225 g of the aqueous resin solution obtained in Reference Example 1, a resin solution having the viscosity of 130 cps was obtained. The resin solution thus obtained was added to the master color prepared in Reference Example 11 in the ratio of the solid content of the resin to the pigment being 0.5 to 100.

EXAMPLE 9

By adding 45 g of Sanisol C (50% solution of lauryldimethylbenzylammoniumchloride, manufactured by Kao Co., Ltd.) into 225 g of the aqueous resin solution obtained in Reference Example 1, a resin solution having the viscosity of 128 cps was obtained. The resin solution thus obtained was added to the master color prepared in Reference Example 11 in the ratio of the solid content of the resin to the pigment being 0.5 to 100.

EXAMPLE 10

By adding 12.5 g of cyclohexyltrimethylammoniumchloride into 125 g of the aqueous resin solution obtained in Reference Example 2, a resin solution having the viscosity of 40 cps was obtained. The resin solution thus obtained was added to the master color prepared in Reference Example 11 in the ratio of the solid content of the resin to the pigment being 0.5 to 100.

EXAMPLE 11

The aqueous resin solution obtained in Reference Example 2 and Coatamine D86P (75% solution of diheptadecyldimethylammoniumchloride, manufactured by Kao Co., Ltd.) were individually added to the master color prepared in Reference Example 11 in the ratio of the weight of the solid content of the former to latter being 5/1 and the total of them to the pigment being 0.5 to 100 based on the solid contents.

EXAMPLE 12

By adding 6.9 g of Coatamine D86P into 172 g of the aqueous resin solution obtained in Reference Example 3, a resin solution having the viscosity of 380 cps was obtained. The resin solution thus obtained was added to the master color prepared in Reference Example 11 in the ratio of the solid content of the resin to the pigment being 0.5 to 100.

EXAMPLE 13

By adding 10.4 g of Sanisol C into 172 g of the aqueous resin solution obtained in Reference Example 3, a resin solution having the viscosity of 330 cps was obtained. The resin solution thus obtained was added to the master color prepared in Reference Example 11 in the ratio of the solid content of the resin to the pigment being 0.5 to 100.

EXAMPLE 14

By adding 20.6 g of tetramethylammoniumbromide into 172 g of the aqueous resin solution obtained in Reference Example 3, a resin solution having the viscosity of 440 cps was obtained. The resin solution thus obtained was added to the master color prepared in Reference Example 11 in the ratio of the solid content of the resin to the pigment being 0.5 to 100.

EXAMPLE 15

By adding 20.6 g of n-hexyltrimethylammoniumbromide into 172 g of the aqueous resin solution obtained in Reference Example 3, a resin solution having the viscosity of 530 cps was obtained. The resin solution thus obtained was added to the master color prepared in Reference Example 11 in the ratio of the solid content of the resin to the pigment being 0.5 to 100.

EXAMPLE 16

By adding 20.6 g of n-octyltrimethylammoniumbromide into 172 g of the aqueous resin solution obtained in Reference Example 3, a resin solution having the viscosity of 610 cps was obtained. The resin solution thus obtained was added to the master color prepared in Reference Example 11 in the ratio of the solid content of the resin to the pigment being 0.5 to 100.

EXAMPLE 17

By adding 20.6 g of n-decyltrimethylammoniumbromide into 172 g of the aqueous resin solution obtained in Reference Example 3, a resin solution having the viscosity of 810 cps was obtained. The resin solution thus obtained was added to the master color prepared in Reference Example 11 in the ratio of the solid content of the resin to the pigment being 0.5 to 100.

EXAMPLE 18

By adding 68.6 g of 30.1% lauryltrimethylammoniumchloride solution into 172 g of the aqueous resin solution obtained in Reference Example 3, a resin solution having the viscosity of 400 cps was obtained. The resin solution thus obtained was added to the master color prepared in Reference Example 11 in the ratio of the solid content of the resin to the pigment being 0.5 to 100.

EXAMPLE 19

By adding 73.3 g of 28.1% n-hexadecyltrimethylammoniumchloride solution into 172 g of the aqueous resin solution obtained in Reference Example 3, a resin solution having the viscosity of 690 cps was obtained. The resin solution thus obtained was added to the master color prepared in Reference Example 11 in the ratio of the solid content of the resin to the pigment being 0.5 to.100.

EXAMPLE 20

By adding 32.6 g of 63.1% stearyltrimethylammoniumchloride solution into 172 g of the aqueous resin solution obtained in Reference Example 3, a resin solution having the viscosity of 1,490 cps was obtained. The resin solution thus obtained was added to the master color prepared in Reference Example 11 in the ratio of the solid content of the resin to the pigment being 0.5 to 100.

EXAMPLE 21

The paper coating compositions prepared in Examples 8 to 20 were adjusted so as to have a total solids content of 60% and a pH of about 9.0 by addition of water and an aqueous 10% sodium hydroxide solution. The physical properties of the thus prepared compositions were measured according to the methods mentioned in Example 7 and the properties thus measured are shown in Tables 3 and 4 bellow.

The thus prepared composition was applied by using a wire rod on one or both sides of fine paper having a basis weight of 80 g/m$^2$ at a single spread of 14 g/m$^2$. The paper was immediately subjected to drying in hot air at 120° C. for 30 seconds, then to moisture-conditioning at 20° C. under a relative humidity of 65% for 16 hours, and thereafter to supercalendering twice at 60° C. and under a linear pressure of 60 kg/cm to obtain coated paper.

Water resistance and ink receptivity of the resulting coated paper were evaluated in accordance with the test methods mentioned in Example 7. The results obtained are shown in Tables 3 and 4 below.

TABLE 3

| Resin (Example No.) | 8 | 9 | 10 | 11 | 12 | 13 |
|---|---|---|---|---|---|---|
| Physical Properties of Coating Composition: | | | | | | |
| pH (25° C.) | 9.2 | 9.3 | 9.0 | 9.2 | 9.1 | 9.1 |
| Viscosity (25° C.) (cps) | 1,830 | 1,870 | 1,880 | 1,810 | 1,790 | 1,780 |
| Coated Paper: | | | | | | |
| Water resistance: | | | | | | |
| WP method | 3.8 | 4.0 | 4.3 | 4.1 | 4.1 | 3.8 |
| Ink receptivity: | | | | | | |
| Method A | 3.9 | 4.6 | 4.7 | 4.7 | 4.7 | 4.5 |
| Method B | 3.8 | 4.4 | 4.2 | 4.5 | 4.4 | 4.4 |

TABLE 4

| Resin (Example No.) | 14 | 15 | 16 | 17 | 18 | 19 | 20 |
|---|---|---|---|---|---|---|---|
| Physical Properties of Coating Composition: | | | | | | | |
| pH (25° C.) | 9.1 | 9.2 | 9.1 | 9.1 | 9.1 | 9.1 | 9.2 |
| Viscosity (25° C.) (cps) | 1,810 | 1,840 | 1,850 | 1,870 | 1,840 | 1,800 | 1,880 |
| Coated Paper: | | | | | | | |
| Water resistance: | | | | | | | |
| WP method | 3.8 | 4.0 | 3.8 | 4.0 | 3.8 | 4.3 | 3.8 |
| Ink receptivity: | | | | | | | |
| Method A | 3.9 | 4.0 | 4.7 | 4.8 | 4.7 | 4.5 | 4.2 |
| Method B | 3.8 | 4.2 | 4.6 | 4.8 | 4.5 | 4.4 | 4.2 |

EXAMPLE 22

Into 225 g of the aqueous resin solution (III) obtained in Reference Example 1, 9.3 g of the aqueous polyamide solution obtained in Reference Example 4 was added, the amount of the polyamide being 5% of the resin (III) based on the solid content. The resulting solution was adjusted to pH 6.5 with sulfuric acid and 1.9 g of water was added thereto to obtain a polyamide containing resin solution having the concentration of 50% and the viscosity of 198 cps was obtained. The resin solution thus obtained was added to the master color prepared in Reference Example 11 in the ratio of the solid content of the resin to the pigment being 0.5 to 100.

EXAMPLE 23

Into the aqueous resin solution (III) obtained in Reference Example 2, the aqueous polyamide solution obtained in Reference Example 4 was added, the amount of the polyamide being 5% of the resin (III) based on the solid content. The resulting solution was adjusted to pH 7.0 with sulfuric acid and water was added thereto to obtain a polyamide containing resin solution having the concentration of 50% and the viscosity of 100 cps was obtained. The resin solution thus obtained was added to the master color prepared in Reference Example 11 in the ratio of the solid content of the resin to the pigment being 0.5 to 100.

EXAMPLE 24

Into the aqueous resin solution (III) obtained in Reference Example 3, the aqueous polyamide solution obtained in Reference Example 4 was added, the amount of the polyamide being 5% of the resin (III) based on the solid content. The resulting solution was adjusted to pH 6.8 with sulfuric acid and water was added thereto to obtain a polyamide containing resin solution having the concentration of 60% and the viscosity of 178 cps was obtained. The resin solution thus obtained was added to the master color prepared in Reference Example 11 in the ratio of the solid content of the resin to the pigment being 0.5 to 100.

EXAMPLE 25

Into the aqueous resin solution (III) obtained in Reference Example 1, the aqueous polyamide solution obtained in Reference Example 4 was added, the amount of the polyamide being 20% of the resin (III) based on the solid content. The resulting solution was adjusted to pH 6.7 with sulfuric acid and water was added thereto to obtain a polyamide containing resin solution having the concentration of 50% and the viscosity of 230 cps was obtained. The resin solution thus obtained was added to the master color prepared in Reference Example 11 in the ratio of the solid content of the resin to the pigment being 0.5 to 100.

EXAMPLE 26

Into the aqueous resin solution (III) obtained in Reference Example 2, the aqueous polyamide solution obtained in Reference Example 5 was added, the amount of the polyamide being 5% of the resin (III) based on the solid content. The resulting solution was adjusted to pH 7.2 with sulfuric acid and water was added thereto to obtain a polyamide containing resin solution having the concentration of 50% and the viscosity of 167 cps was obtained. The resin solution thus obtained was added to the master color prepared in Reference Example 11 in the ratio of the solid content of the resin to the pigment being 0.5 to 100.

EXAMPLE 27

Into the aqueous resin solution (III) obtained in Reference Example 3, the aqueous polyamide solution obtained in Reference Example 5 was added, the amount of the polyamide being 20% of the resin (III) based on the solid content. The resulting solution was adjusted to pH 6.9 with sulfuric acid and water was added thereto to obtain a polyamide containing resin solution having the concentration of 60% and the viscosity of 331 cps was obtained. The resin solution thus obtained was added to the master color prepared in Reference Example 11 in the ratio of the solid content of the resin to the pigment being 0.5 to 100.

EXAMPLE 28

Into the aqueous resin solution (III) obtained in Reference Example 3, the aqueous polyamide solution obtained in Reference Example 4 was added, the amount of the polyamide being 50% of the resin (III) based on the solid content. The resulting solution was adjusted to pH 6.8 with sulfuric acid and water was added thereto to obtain a polyamide containing resin solution having the concentration of 60% and the viscosity of 342 cps was obtained. The resin solution thus obtained was added to the master color prepared in Reference Example 11 in the ratio of the solid content of the resin to the pigment being 0.5 to 100.

EXAMPLE 29

Into the aqueous resin solution (III) obtained in Reference Example 3, the aqueous polyamide solution obtained in Reference Example 6 was added, the amount of the polyamide being 20% of the resin (III) based on the solid content. The resulting solution was adjusted to pH 7.2 with sulfuric acid and water was added thereto to obtain a polyamide containing resin solution having the concentration of 60% and the viscosity of 346 cps was obtained. The resin solution thus obtained was added to the master color prepared in Reference Example 11 in the ratio of the solid content of the resin to the pigment being 0.5 to 100.

EXAMPLE 30

Into the aqueous resin solution (III) obtained in Reference Example 3, the aqueous polyamide solution obtained in Reference Example 7 was added, the amount of the polyamide being 20% of the resin (III) based on the solid content. The resulting solution was adjusted to pH 7.1 with sulfuric acid and water was added thereto to obtain a polyamide containing resin solution having the concentration of 60% and the viscosity of 340 cps was obtained. The resin solution thus obtained was added to the master color prepared in Reference Example 11 in the ratio of the solid content of the resin to the pigment being 0.5 to 100.

EXAMPLE 31

Into the aqueous resin solution (III) obtained in Reference Example 3, the aqueous polyamide solution obtained in Reference Example 8 was added, the amount of the polyamide being 20% of the resin (III) based on the solid content. The resulting solution was adjusted to pH 7.2 with sulfuric acid and water was added thereto to obtain a polyamide containing resin solution having the concentration of 60% and the viscosity of 372 cps was obtained. The resin solution thus obtained was added to the master color prepared in Reference Example 11 in the ratio of the solid content of the resin to the pigment being 0.5 to 100.

EXAMPLE 32

Into the aqueous resin solution (III) obtained in Reference Example 3, the aqueous polyamide solution obtained in Reference Example 9 was added, the amount of the polyamide being 20% of the resin (III) based on the solid content. The resulting solution was adjusted to pH 6.9 with sulfuric acid and water was added thereto to obtain a polyamide containing resin solution having the concentration of 60% and the viscosity of 356 cps was obtained. The resin solution thus obtained was added to the master color prepared in Reference Example 11 in the ratio of the solid content of the resin to the pigment being 0.5 to 100.

EXAMPLE 33

Into the aqueous resin solution (III) obtained in Reference Example 3, the aqueous polyamide solution obtained in Reference Example 10 was added, the amount of the polyamide being 20% of the resin (III) based on the solid content. The resulting solution was adjusted to pH 7.2 with sulfuric acid and water was added thereto to obtain a polyamide containing resin solution having the concentration of 60% and the viscosity of 342 cps was obtained. The resin solution thus obtained was added to the master color prepared in Reference Example 11 in the ratio of the solid content of the resin to the pigment being 0.5 to 100.

EXAMPLE 34

The aqueous resin solution obtained in Reference Example 1 and the aqueous polyamide solution obtained in Reference Example 4 were added individually to the master color prepared in Reference Example 11 wherein the weight ratio of the resin solution to the polyamide solution was 90 to 4 (based on the solid content it was 95 to 5) and the ratio of the total solid weight of the resin and the polyamide to the pigment in the master color is 0.5 to 100.

EXAMPLE 35

The paper coating compositions prepared in Examples 22 to 34 were adjusted so as to have a total solids content of 60% and a pH of about 9.0 by addition of water and an aqueous 10% sodium hydroxide solution. The physical properties of the thus prepared compositions were measured according to the methods mentioned in Example 7 and the properties thus measured are shown in Tables 5 and 6 bellow.

The thus prepared composition was applied by using a wire rod on one or both sides of fine paper having a basis weight of 80 g/m$^2$ at a single spread of 14 g/m$^2$. The paper was immediately subjected to drying in hot air at 120° C. for 30 seconds, then to moisture-conditioning at 20° C. under a relative humidity of 65% for 16 hours, and thereafter to supercalendering twice at 60° C. and under a linear pressure of 60 kg/cm to obtain coated paper.

Water resistance and ink receptivity of the resulting coated paper were evaluated in accordance with the test methods mentioned in Example 7. The results obtained are shown in Tables 5 and 6 below.

TABLE 5

| Resin (Example No.) | 22 | 23 | 24 | 25 | 26 | 27 |
|---|---|---|---|---|---|---|
| Physical Properties of Coating Composition: | | | | | | |
| pH (25° C.) | 9.2 | 9.3 | 9.0 | 9.2 | 9.1 | 9.1 |
| Viscosity (25° C.) (cps) | 1,820 | 1,790 | 1,830 | 1,860 | 1,800 | 1,880 |
| Coated Paper: | | | | | | |
| Water resistance: | | | | | | |
| WP method | 4.0 | 4.5 | 4.3 | 4.1 | 4.5 | 4.4 |
| Ink receptivity: | | | | | | |
| Method A | 3.9 | 4.5 | 4.5 | 4.0 | 4.5 | 4.5 |
| Method B | 3.7 | 4.2 | 4.3 | 4.1 | 4.2 | 4.5 |

TABLE 6

| Resin (Example No.) | 28 | 29 | 30 | 31 | 32 | 33 | 34 |
|---|---|---|---|---|---|---|---|
| Physical Properties of Coating Composition: | | | | | | | |
| pH (25° C.) | 9.0 | 9.1 | 9.0 | 9.2 | 9.2 | 9.1 | 9.3 |
| Viscosity (25° C.) (cps) | 1,910 | 1,830 | 1,880 | 1,890 | 1,870 | 1,850 | 1,830 |
| Coated Paper: | | | | | | | |
| Water resistance: | | | | | | | |
| WP method | 4.2 | 4.0 | 4.2 | 4.0 | 4.1 | 4.2 | 4.0 |
| Ink receptivity: | | | | | | | |
| Method A | 4.7 | 4.5 | 4.3 | 4.2 | 4.0 | 4.1 | 3.8 |
| Method B | 4.7 | 4.3 | 4.1 | 4.4 | 4.2 | 4.5 | 3.8 |

Comparative Example 1

The aqueous resin solution obtained in Reference Example 1 was added to the master color prepared in Reference Example 11 in the ratio of the solid content of the resin to the pigment being 0.5 to 100 to prepare a paper coating composition.

Comparative Example 2

The aqueous resin solution obtained in Reference Example 2 was added to the master color prepared in Reference Example 11 in the ratio of the solid content of the resin to the pigment being 0.5 to 100 to prepare a paper coating composition.

Comparative Example 3

The aqueous resin solution obtained in Reference Example 3 was added to the master color prepared in Reference Example 11 in the ratio of the solid content of the resin to the pigment being 0.5 to 100 to prepare a paper coating composition.

Comparative Example 4

The master color prepared in Reference Example 11 was used as a paper coating composition without adding other compound.

Comparative Example 5

The paper coating compositions prepared in Comparative Examples 1 to 4 were adjusted so as to have a total solids content of 60% and a pH of about 9.0 by addition of water and an aqueous 10% sodium hydroxide solution. The physical properties of the thus prepared compositions were measured according to the methods mentioned in Example 7 and the properties thus measured are shown in Table 7 bellow.

The thus prepared composition was applied by using a wire rod on one or both sides of fine paper having a basis weight of 80 g/m$^2$ at a single spread of 14 g/m$^2$. The paper was immediately subjected to drying in hot air at 120° C. for 30 seconds, then to moisture-conditioning at 20° C. under a relative humidity of 65% for 16 hours, and thereafter to supercalendering twice at 60° C. and under a linear pressure of 60 kg/cm to obtain coated paper.

Water resistance and ink receptivity of the resulting coated paper were evaluated in accordance with the test methods mentioned in Example 7. The results obtained are shown in Table 7 below.

TABLE 5

| Resin (Comparative Example No.) | 1 | 2 | 3 | 4 |
|---|---|---|---|---|
| Physical Properties of Coating Composition: | | | | |
| pH (25° C.) | 9.2 | 9.0 | 9.1 | 9.3 |
| Viscosity (25° C.) (cps) | 1,820 | 1,860 | 1,770 | 1,650 |
| Coated Paper: | | | | |
| Water resistance: | | | | |
| WP method | 3.0 | 3.5 | 3.0 | 1.0 |
| Ink receptivity: | | | | |
| Method A | 3.2 | 3.3 | 3.5 | 1.0 |
| Method B | 3.1 | 3.0 | 3.5 | 1.0 |

The coated paper obtained by using the paper coating composition of the present invention has various excellent properties, such as ink receptivity, water resistance, etc.

While the invention has been described in detail and with reference to specific examples thereof, it will be apparent to one skilled in the art that various changes and modifications can be made therein without departing from the spirit and scope thereof.

What is claimed is:

1. A paper coating composition which comprises:
   (I) a pigment;
   (II) an aqueous binder;

(III) a water-soluble resin obtainable by the reaction of at least
- (a) an alkylenediamine or a polyalkylenepolyamine,
- (b) an urea compound, and
- (c) a compound selected from the group consisting of aldehydes, epihalohydrins, and α, γ-dihalo-β-hydrins; and (IV) a compound selected from the group consisting of
- (f) amines selected from the group consisting of monoamines, diamines and their salts each having at least 5 carbon atoms,
- (g) quaternary organic ammonium salts, and
- (h) polyamides obtainable by the reaction between a dibasic carboxylic compound and a polyamine.

2. A composition according to claim 1, wherein the water-soluble resin of the component (III) is obtained by the reaction of
- (a) an alkylenediamine or a polyalkylenepolyamine,
- (b) an urea compound,
- (c) a compound selected from the group consisting of aldehydes, epihalohydrins, and α,γ-dihalo-β-hydrins, and
- (d) a divalent carboxylic compound.

3. A composition according to claim 2, wherein the dibasic carboxylic compound of the ingredient (d) is a free acid, an ester, or an acid anhydride.

4. A composition according to claim 1, wherein the water-soluble resin of the component (III) is obtained by the reaction of
- (a) an alkylenediamine or a polyalkylenepolyamine,
- (b) an urea compound,
- (c) a compound selected from the group consisting of aldehydes, epihalohydrins, and α,γ-dihalo-β-hydrins, and
- (e) an alicyclic compound selected from alicyclic amines having at least one active hydrogen atom and alicyclic epoxy compounds.

5. A composition according to claim 1, wherein the water-soluble resin of the component (III) is obtained by the reaction of
- (a) an alkylenediamine or a polyalkylenepolyamine,
- (b) an urea compound,
- (c) a compound selected from the group consisting of aldehydes, epihalohydrins, and α,γ-dihalo-β-hydrins, and
- (d) a divalent carboxylic compound, and
- (e) an alicyclic compound selected from the group consisting of alicyclic amines having at least one active hydrogen atom and alicyclic epoxy compounds.

6. A composition according to claim 1, wherein the compound (IV) is (f) the amine.

7. A composition according to claim 1, wherein the compound (IV) is (g) the quaternary organic ammonium salt.

8. A composition according to claim 7, wherein (g) the quaternary organic ammonium salt of the component is a mono- or di-quaternary ammonium salt in which four hydrocarbon groups link to a quaternary nitrogen atom and at least two thereof independently of one another are each an alkyl group having 1 to 3 carbon atoms.

9. A composition according to claim 8, wherein (g) the quaternary organic ammonium salt is a mono-quaternary ammonium salt in which three methyl groups and one alkyl group having 8 to 12 carbon atoms link to the quaternary nitrogen atom.

10. A composition according to claim 1, wherein the compound (IV) is (h) the polyamide obtainable by the reaction between the dibasic carboxylic compound and the polyamine.

11. A composition according to claim 10, wherein (h) the polyamide is obtained by the reaction between the dibasic carboxylic compound and an alicyclic diamine.

12. A composition according to claim 10, wherein (h) the polyamide is obtained by the reaction between an alicyclic dibasic carboxylic compound and the polyamine.

13. A composition according to claim 10, wherein (h) the polyamide is obtained by the reaction between an aromatic dibasic carboxylic compound and the polyamine.

14. A composition according to claim 10, wherein (h) the polyamide is obtained by the reaction between an aliphatic dibasic carboxylic compound having at least 4 carbon atoms and the polyamine.

15. A composition according to claim 10, wherein the dibasic carboxylic compound to be used for obtaining (h) the polyamide is a free acid, an ester or an acid anhydride.

16. A composition according to claim 1, which comprises, per 100 parts by weight of the pigment (I), 5 to 200 parts by weight of the aqueous binder (II) and 0.05 to 5 parts by weight of the water-soluble resin (III); and based on the solid weight of the water-soluble resin (III), 1 to 90% by weight of the compound (IV).

17. A composition according to claim 16, wherein the compound (IV) is present in an amount of 3 to 80% by weight based on the solid weight of the water-soluble resin (III).

18. A composition according to claim 1, wherein said compound (c) is α,γ-dihalo-β-hydrins.

* * * * *